(12) United States Patent
Mori

(10) Patent No.: US 10,343,247 B2
(45) Date of Patent: Jul. 9, 2019

(54) MACHINE TOOL SYSTEM AND WORKPIECE TRANSPORT METHOD

(71) Applicant: MURATA MACHINERY, LTD., Kyoto-shi, Kyoto (JP)

(72) Inventor: Ryuzo Mori, Inuyama (JP)

(73) Assignee: MURATA MACHINERY, LTD., Kyoto (JP)

( * ) Notice: Subject to any disclaimer, the term of this patent is extended or adjusted under 35 U.S.C. 154(b) by 201 days.

(21) Appl. No.: 15/513,569

(22) PCT Filed: Aug. 6, 2015

(86) PCT No.: PCT/JP2015/072368
§ 371 (c)(1),
(2) Date: Mar. 23, 2017

(87) PCT Pub. No.: WO2016/047288
PCT Pub. Date: Mar. 31, 2016

(65) Prior Publication Data
US 2017/0282322 A1    Oct. 5, 2017

(30) Foreign Application Priority Data

Sep. 24, 2014   (JP) .................................. 2014-193621

(51) Int. Cl.
*B23P 23/02*    (2006.01)
*B23Q 1/48*    (2006.01)
(Continued)

(52) U.S. Cl.
CPC ................ *B23Q 39/04* (2013.01); *B23B 3/12* (2013.01); *B23B 9/00* (2013.01); *B23B 11/00* (2013.01);
(Continued)

(58) Field of Classification Search
CPC ............. Y10T 29/5124; Y10T 29/5196; Y10T 29/5109–29/5114; B23Q 7/04; B23Q 41/02; B23B 1/00–11/00
(Continued)

(56) References Cited

U.S. PATENT DOCUMENTS

2006/0207397 A1\* 9/2006 Hiramoto .................. B23B 3/06 82/117
2014/0067109 A1    3/2014 Kawai

FOREIGN PATENT DOCUMENTS

DE            3420531 A1 \* 12/1985
JP            62-264852 A \* 11/1987
(Continued)

OTHER PUBLICATIONS

Machine Translation of DE 3420531 A1, which DE '531 was published Dec. 1985.\*
(Continued)

*Primary Examiner* — Erica E Cadugan
(74) *Attorney, Agent, or Firm* — Keating & Bennett, LLP

(57) ABSTRACT

A lathe includes a lathe-side chuck that holds a workpiece with the workpiece directed toward or facing a front side, a main spindle that rotates around an axis, and a tool that machines the workpiece. A machining center includes a rotary tool that rotates around an axis in the horizontal direction and an MC-side chuck that holds the workpiece and is able to turn between at least a workpiece pass/receive position in which the workpiece is directed toward or facing the front side and a machining position in which the workpiece is directed toward or facing the rotary tool. A loader includes a guide rail extending above the lathe-side chucks, and MC-side chuck along the horizontal direction and a loader head that holds the workpiece and carries the work-
(Continued)

piece between at least the lathe-side chucks, and MC-side chuck by moving along the guide rail.

7 Claims, 7 Drawing Sheets

(51) Int. Cl.
B23Q 7/04 (2006.01)
B23Q 39/04 (2006.01)
B23Q 41/02 (2006.01)
B23B 11/00 (2006.01)
B23B 13/04 (2006.01)
B23C 1/025 (2006.01)
B23B 3/12 (2006.01)
B23P 23/00 (2006.01)
B23B 9/00 (2006.01)
B23Q 7/14 (2006.01)
B23Q 39/00 (2006.01)

(52) U.S. Cl.
CPC ............ *B23B 13/04* (2013.01); *B23C 1/025* (2013.01); *B23P 23/00* (2013.01); *B23Q 1/4857* (2013.01); *B23Q 7/04* (2013.01); *B23Q 7/1415* (2013.01); *B23Q 41/02* (2013.01); *B23Q 2039/002* (2013.01); *B23Q 2039/004* (2013.01); *B23Q 2039/008* (2013.01); *Y10T 29/5107* (2015.01); *Y10T 29/5114* (2015.01); *Y10T 29/5124* (2015.01); *Y10T 82/2514* (2015.01); *Y10T 82/2524* (2015.01)

(58) Field of Classification Search
USPC .............................. 29/563, 33 P, 27 R–27 C
See application file for complete search history.

(56) References Cited

FOREIGN PATENT DOCUMENTS

| JP | 10-309649 A | 11/1998 |
| JP | 2000-280151 A | 10/2000 |
| JP | 3489070 B2 | 1/2004 |
| JP | 2012-110997 A * | 6/2012 |
| JP | 2012-110997 A | 6/2012 |
| JP | 2013-136137 A | 7/2013 |

OTHER PUBLICATIONS

Machine Translation of JP 62-264852 A, which JP '852 was published Nov. 1987.*
Machine Translation of JP 2012-110997 A, which JP '997 was published Jun. 2012.*

* cited by examiner

MACHINE TOOL SYSTEM AND WORKPIECE TRANSPORT METHOD

BACKGROUND OF THE INVENTION

1. Field of the Invention

The present invention relates to a machine tool system and a workpiece transport method.

2. Description of the Related Art

As machine tools that machine workpieces, there are known lathes such as parallel biaxial lathes (e.g., see Japanese Unexamined Patent Application Publication No. 2012-110997), machining centers that include drilling centers, tapping machines, and the like (e.g., see Japanese Patent No. 3489070), and others. A lathe and a machining center each include a dedicated loader that carries a workpiece to the machining area. There are also machine tool systems in which a workpiece is carried between a lathe and a machining center and then machined by the lathe or machining center. In such a machine tool system, for example, when carrying a workpiece from a lathe to a machining center, a lathe loader carries the workpiece from the machining area of the lathe to a pass/receive area and then a machining-center loader carries the workpiece from the pass/receive area to the machining area of the machining center.

However, this machine tool system has a problem that temporarily carrying the workpiece to the pass/receive position and then carrying it to the machining position increases the workpiece carrying time and therefore fails to reduce the machining time. This machine tool system also has a problem that it needs a workpiece pass/receive position, resulting in upsizing of the entire system.

SUMMARY OF THE INVENTION

Preferred embodiments of the present invention provide a machine tool system and workpiece transport method that are able to reduce the workpiece carrying time to reduce the workpiece machining time, and are able to prevent or significantly reduce upsizing of the entire system.

A machine tool system according to a preferred embodiment of the present invention includes a lathe, a machining center disposed side by side with the lathe, and a loader that carries a workpiece. The lathe includes a lathe-side workpiece holder that holds the workpiece with the workpiece directed toward or facing a front side of the machine tool system, a main spindle that rotates around an axis, and a tool that machines the workpiece. The machining center includes a rotary tool that rotates around an axis in a horizontal direction and a machining center-side workpiece holder that holds the workpiece and is able to turn between at least a position in which the machining center-side workpiece holder holds the workpiece with the workpiece directed toward or facing the front side and a position in which the machining center-side workpiece holder holds the workpiece with the workpiece directed toward or facing the rotary tool. The loader includes a guide disposed extending above the lathe-side workpiece holder and the machining center-side workpiece holder along the horizontal direction and a loader head that holds the workpiece and carries the workpiece between at least the lathe-side workpiece holder and the machining center-side workpiece holder located in the position in which the workpiece is directed toward or facing the front side by moving along the guide.

Vertical distances from the guide to the lathe-side workpiece holder and the machining center-side workpiece holder are able to be set to the same distance. The machining center-side workpiece holder is able to move between a position identical to a workpiece pass/receive position in a direction along a front of the lathe-side workpiece holder and a position in which machining is performed using the rotary tool. The lathe may include multiple main spindles that are arranged side by side in the horizontal direction. The machine tool system may include a workpiece placement unit that is disposed on at least one of both sides sandwiching the lathe and the machining center and is used to carry in or carry out the workpiece. The guide is able to be disposed in such a manner that the loader head is able to connect to (e.g., to access, and to load a workpiece to or unload a workpiece from) the workpiece placement unit. The machine tool system may include a lathe controller configured or programmed to control the lathe and a machining-center controller that controls the machining center. Preferably, one of the lathe controller and the machining-center controller is configured or programmed to control the loader.

A preferred embodiment of the present invention provides a method for transporting a workpiece between a lathe and a machining center disposed side by side with the lathe using a loader. The lathe includes a lathe-side workpiece holder that holds the workpiece with the workpiece directed toward or facing a front side, a main spindle that rotates around an axis, and a tool that machines the workpiece. The machining center includes a rotary tool that rotates around an axis in a horizontal direction and a machining center-side workpiece holder that holds the workpiece and is able to turn between at least a position in which the machining center-side workpiece holder holds the workpiece with the workpiece directed toward or facing the front side and a position in which the machining center-side workpiece holder holds the workpiece with the workpiece directed toward or facing the rotary tool. The method includes the loader moving along a guide extending above the lathe-side workpiece holder and the machining center-side workpiece holder along the horizontal direction and carrying the workpiece between the lathe-side workpiece holder and the machining center-side workpiece holder located in the position in which the workpiece is directed toward or facing the front side.

According to a preferred embodiment of the present invention, the loader is able to pass the workpiece not only to the lathe-side workpiece holder but also to the machining center-side workpiece holder directed toward or facing the front side of the machining center (e.g., facing the front side of the machining center). Thus, it is possible to reduce the workpiece carrying time and to reduce the workpiece machining time. Also, there is no need to provide a workpiece pass/receive position between the lathe and the machining center. Thus, upsizing of the entire system is able to be prevented or significantly reduced.

Also, vertical distances from the guide to the lathe-side workpiece holder and machining center-side workpiece holder are able to be set to the same distance. Thus, the loader is able to pass the workpiece to the lathe and machining center, which are different types of machines, by performing the same or similar vertical operations. Also, the machining center-side workpiece holder is able to move between the same position as a workpiece pass/receive position in a direction along a front of the lathe-side workpiece holder and a position in which machining is performed using the rotary tool. Thus, even if the workpiece pass/receive position and workpiece machining position are different in the machining center, the workpiece is passed in the same position as the workpiece pass/receive position in the direction along the front of the lathe-side workpiece holder. As a result, the loader is able to pass or receive the workpiece to or from the lathe and machining center by performing the same operation. Also, the main spindle is able to include multiple main spindles that are arranged side by side in the horizontal direction. Thus, the number of workpieces machined per unit time is able to be increased, and the loader is able to receive the workpiece held by one of the main spindles disposed side by side by performing a similar operation. Also, the machine tool system is able to include a workpiece placement unit that is disposed on at least one of both sides sandwiching the lathe and the machining center and is used to carry in or carry out the workpiece, and the guide is able to be disposed in such a manner that the loader head is able to connect to the workpiece placement unit. Thus, the workpiece placement unit is shared by the lathe and machining center. As a result, upsizing of the machine tool system is able to be prevented or significantly reduced. Also, the machine tool system is able to include a lathe controller that controls the lathe and a machining-center controller that controls the machining center, and one of the lathe controller and the machining-center controller is able to control the loader, for example. Thus, the loader is able to be controlled efficiently.

According to the workpiece carrying method according to a preferred embodiment of the present invention, the machining center-side workpiece holder directs the workpiece to the front side. Thus, the loader is able to easily transport the workpiece between the lathe and machining center.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1A:
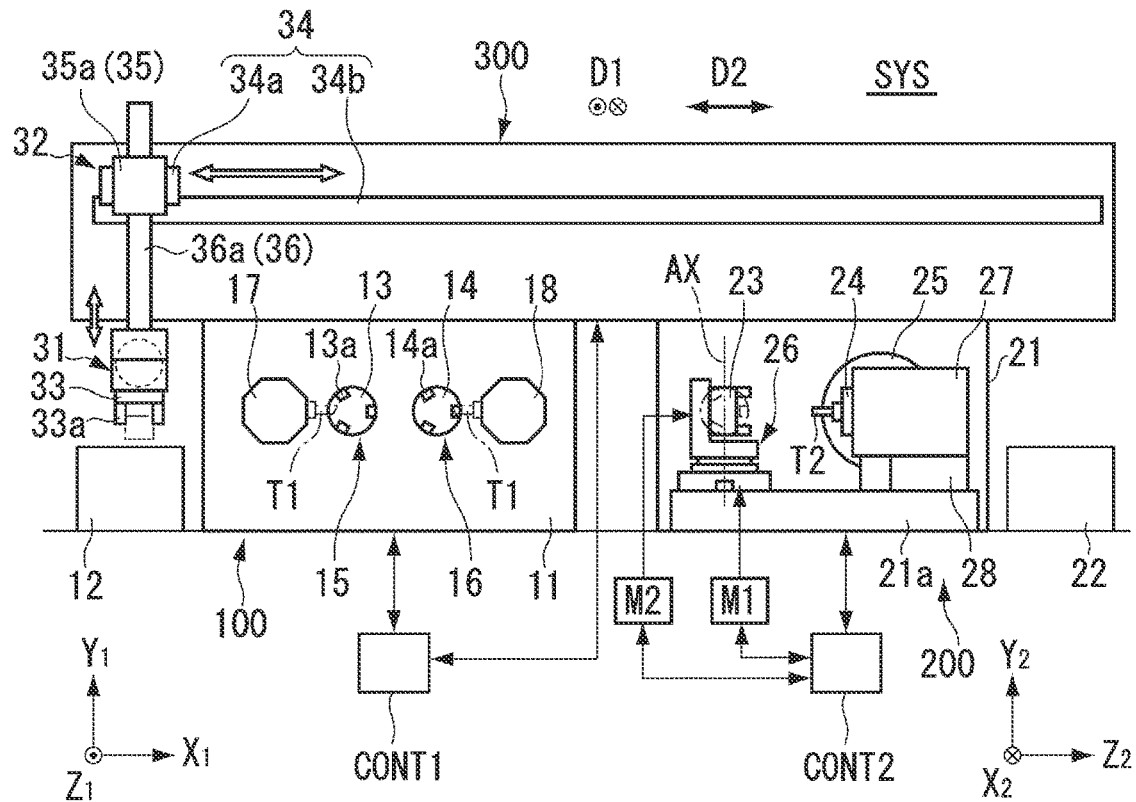
FIGS. 1A and 1B include a diagram showing an example of a machine tool system according to a preferred embodiment of the present invention.

Preferred embodiments of the present invention will be described with reference to the drawings. However, preferred embodiments of the present invention are not limited thereto. To clarify preferred embodiments of the present invention, the drawings are scaled, for example, partially enlarged or highlighted, as necessary. In the drawings, directions are shown by two coordinate systems (an $X_1Y_1Z_1$ coordinate system and an $X_2Y_2Z_2$ coordinate system). In preferred embodiments of the present invention, the $X_1Y_1Z_1$ coordinate system will be used to describe the structure, operation, and the like of a lathe 100 and a loader 300, and the $X_2Y_2Z_2$ coordinate system will be used to describe the structure, operation, and the like of a machining center 200.

In the $X_1Y_1Z_1$ coordinate system and $X_2Y_2Z_2$ coordinate system, planes parallel with the horizontal plane will be referred to as an $X_1Z_1$ plane and an $X_2Z_2$ plane, respectively; the directions parallel with the $X_1Z_1$-plane and $X_2Z_2$-plane as a $Z_1$-direction and a $Z_2$-direction; the directions perpendicular to the $Z_1$-direction and $Z_2$-direction as an $X_1$-direction and an $X_2$-direction; and the directions perpendicular to the $X_1Z_1$-plane and $X_2Z_2$-plane as a $Y_1$-direction and a $Y_2$-direction. The $Z_1$-direction is a direction parallel with the axial directions of main spindles 15, 16 of the lathe 100, and the $Z_2$-direction is a direction parallel with the axial direction of a tool main spindle 24 (to be discussed later) of the machining center 200. In the drawings, directions shown by arrows are the positive directions of the $X_1$-, $Y_1$-, and $Z_1$-directions and $X_2$-, $Y_2$-, and $Z_2$-directions, and opposite directions are the negative directions thereof. The positive $X_1$-direction (the negative $X_1$-direction) and the positive $Z_2$-direction (the negative $Z_2$-direction) are the same direction. In preferred embodiments of the present invention below, the front side is a side from which the operator is able to access the machining area of the lathe 100 or the machining center 200. The lathe 100 or the machining center 200 may be provided with a front door, operation panel, or the like on the front side thereof.

Figure 1B:
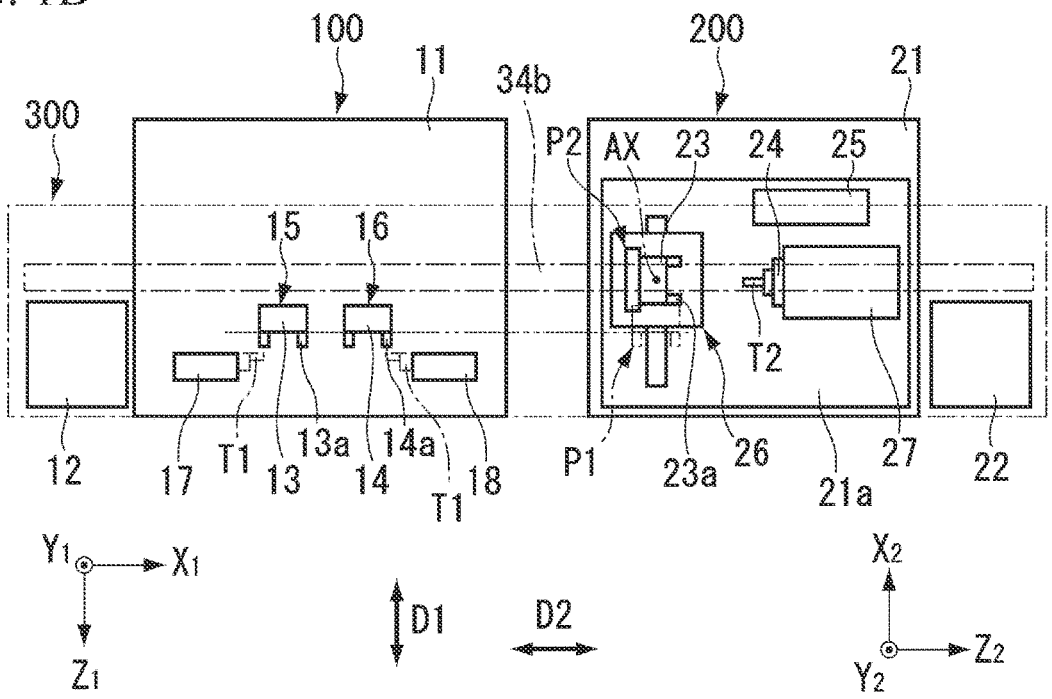

FIGS. 1A and 1B include diagrams showing an example of a machine tool system SYS in which FIG. 1A is a front view, and FIG. 1B is a plan view. As shown in FIGS. 1A and 1B, the machine tool system SYS includes the lathe 100, the machining center 200, and the loader 300.

The lathe 100 is, for example, a parallel biaxial lathe and is disposed with the front side thereof directed toward or facing the positive $Z_1$-direction (a first direction D1). The lathe 100 includes a main body 11 and a workpiece placement unit 12, for example.

The main body 11 includes the main spindles 15, 16 and turrets 17, 18. The main spindles 15, 16 are disposed side by side (e.g., adjacent to each other) in a second direction D2 (the $X_1$-direction). The main spindles 15, 16 are supported by bearings or the like so as to be rotatable around axes parallel with the $Z_1$-direction. The main spindles 15, 16 are provided with lathe-side chucks (lathe-side workpiece holders) 13, 14 on the positive $Z_1$-side ends thereof. The lathe-side chucks 13, 14 include grasping claws 13a and grasping claws 14a, respectively. Preferably, both the grasping claws 13a and the grasping claws 14a are multiple grasping claws disposed at predetermined intervals along the rotation direction of the main spindle 15 or 16. Both the grasping claws 13a and the grasping claws 14a are able to hold a workpiece W when moved in the radial direction of the main spindle 15 or 16 by a chuck drive unit, for example.

The turrets 17, 18 are disposed so as to be off the axial directions of the main spindles 15, 16. For example, the turret 17 is disposed on the negative $X_1$-side of the main spindle 15, and the turret 18 is disposed on the positive $X_1$-side of the main spindle 16. The turrets 17, 18 include rotary drive units such as motors, for example. The turrets 17, 18 are able to be rotated around axes parallel with the $Z_1$ direction by the rotary drive units. The turrets 17, 18 are provided with multiple holders that hold cutting tools (tools) T1 on the circumferential surfaces thereof. All or some of these holders hold the cutting tools T1 so as to correspond to the main spindles 15, 16. Thus, the cutting tools T1 and lathe-side chucks 13, 14 are disposed side by side. Accordingly, by rotating the turret 17 or 18, a desired cutting tool T1 is selected. The cutting tools T1 held by the holders of the turrets 17, 18 are able to be replaced with respect to the respective holders. The cutting tools T1 include cutting tools that cut the workpiece W, as well as rotary tools, such as a drill and an end mill, for example. The turrets 17, 18 are able to be moved in the $X_1$- and $Z_1$-directions by drive units.

The workpiece placement unit 12 has thereon (e.g., is able to support) the workpiece W, which is to be machined by the lathe 100. The workpiece placement unit 12 is, for example, a fixed base, but is not limited thereto. For example, it is able to be a conveyor, rotary pedestal, or the like.

The machining center 200 is disposed so as to direct the front side thereof (the negative $X_2$-side thereof) to the first direction D1 and so as to be side by side with the lathe 100 in the second direction D2. The machining center 200 according to a preferred embodiment of the present invention is a so-called horizontal machining center and includes a main body and a workpiece placement unit 22, for example. The machining center 200 also includes machines that machine a workpiece by rotating, including a so-called drilling center and tapping machine, for example.

Figure 2:
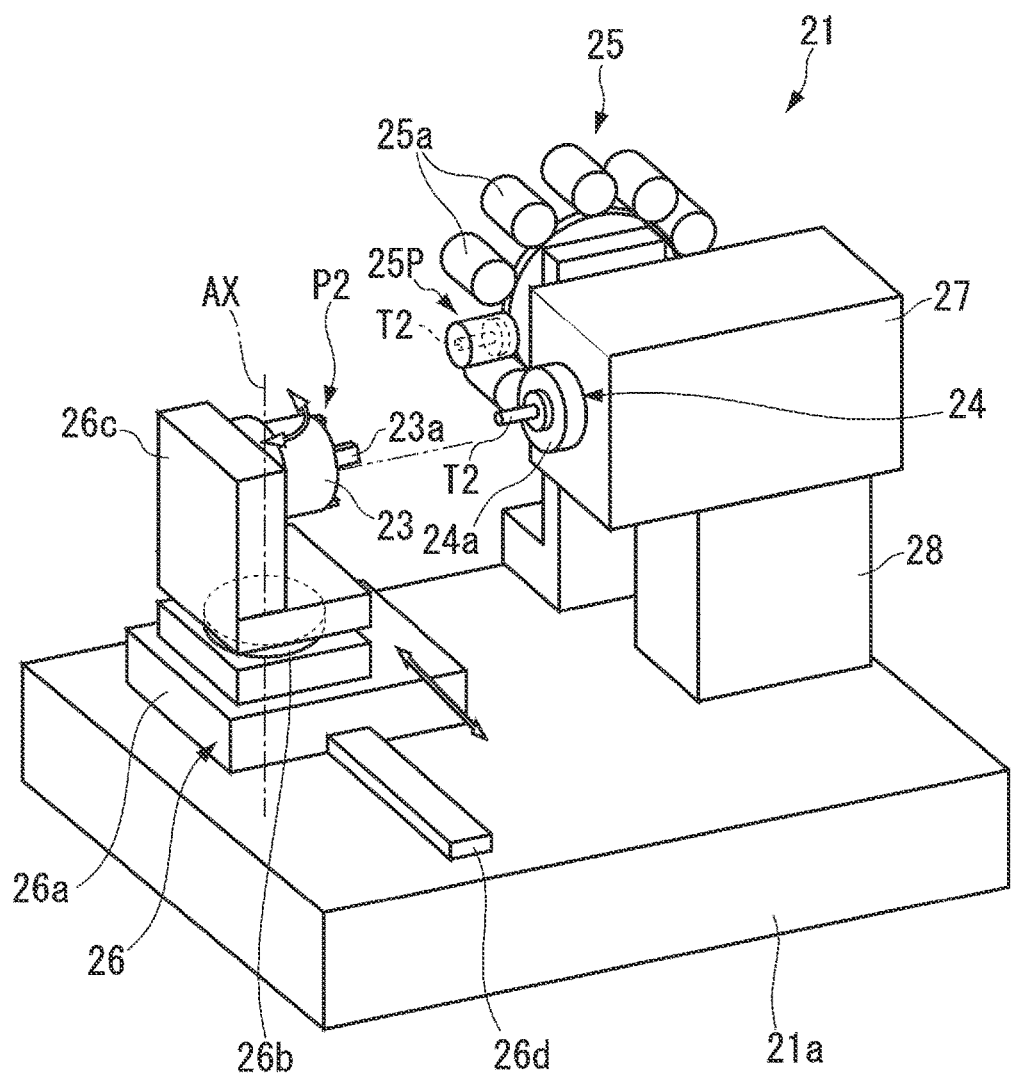
FIG. 2 is a perspective view showing an example of a machining center according to a preferred embodiment of the present invention.
Figure 3:
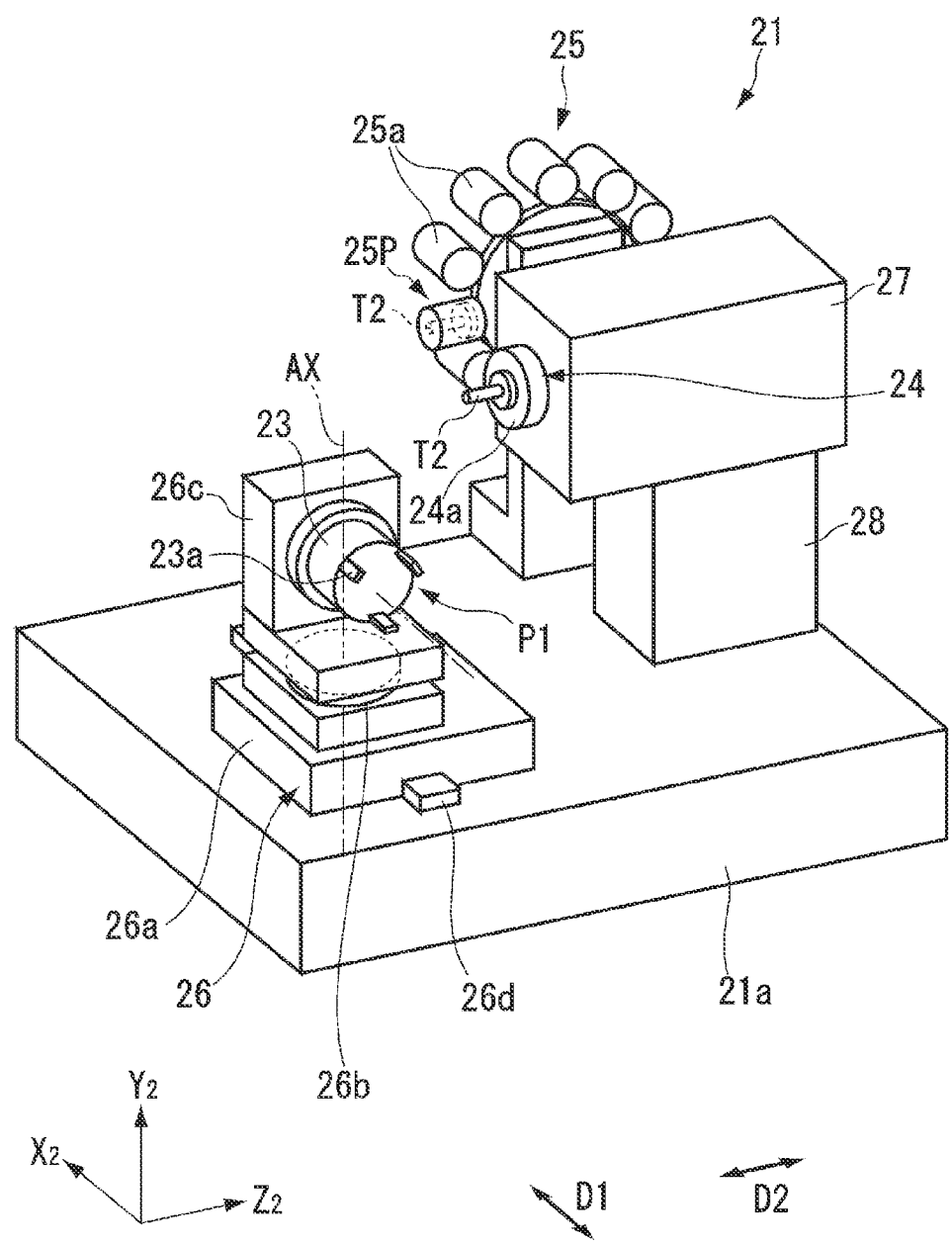
FIG. 3 is a perspective view showing an example of a machining center according to a preferred embodiment of the present invention.

FIGS. 2 and 3 are perspective views showing an example of the main body 21 of the machining center 200. As shown in FIGS. 1 to 3, the main body 21 includes an MC-side chuck (a machining center-side workpiece holder) 23, a tool main spindle 24, and a tool magazine 25. The MC-side chuck 23, tool main spindle 24, and tool magazine 25 are disposed on a bed 21a, for example.

The MC-side chuck 23 includes multiple grasping claws 23a, for example. Preferably, as shown in FIG. 2, the grasping claws 23a are disposed at predetermined intervals about an axis parallel with the $Z_2$-direction. The grasping claws 23a are able to be moved in the radial direction of the MC-side chuck 23 by a drive system. The workpiece W is able to be held by the grasping claws 23a by moving them in the radial direction of the MC-side chuck 23.

The MC-side chuck 23 is supported by a chuck moving unit 26 so as to be able to reciprocate in the first direction D1 (the $X_2$ direction). The MC-side chuck 23 is able to move between a workpiece pass/receive position P1 (see FIGS. 1B and 3, for example) and a machining position P2 (see FIGS. 1B and 2, for example). In a state shown in FIG. 2, the MC-side chuck 23 is located in the machining position P2. The machining position P2 is a position in which the workpiece W is able to be machined using a rotary tool T2, for example. The chuck moving unit 26 includes an X slide 26a, a rotary unit 26b, and a table 26c, for example. The X slide 26a is able to move along a guide 26d in the first direction D1 (the $X_2$-direction) and is driven by a drive system M1. The drive system M1 is, for example, a drive source such as a motor, or a transmission mechanism such as a ball screw, but may be other drive mechanisms. When the X slide 26a moves in the first direction D1 (the $X_2$-direction), the MC-side chuck 23 moves in the first direction D1 (the $X_2$-direction) together with the X slide 26a, rotary unit 26b, and table 26c.

The rotary unit 26b is disposed over the X slide 26a (on the positive $Y_2$-side thereof). The rotary unit 26b moves in the first direction D1 (the $X_2$-direction) together with the X slide 26a. The rotary unit 26b is disposed so as to be rotatable around an axis AX parallel with the $Y_2$-direction and is driven by a drive system M2. The drive system M2 is, for example, a motor.

The table 26c is in the shape of L and includes a wall along a plane perpendicular to a X2Z2 plane. The wall of the table 26c holds the MC-side chuck 23. The table 26c is fixed to an upper portion of the rotary unit 26b (on the positive Y2-side thereof) and is rotatable together with the rotary unit 26b. When the table 26c rotates together with the rotary unit 26b, the MC-side chuck 23 is able to turn between a position in which the grasping claws 23a are directed toward or facing the front side (the negative X2-side), as shown in FIG. 3, and a position in which the grasping claws 23a are directed toward or facing the tool main spindle 24 side (the positive Z2-side), as shown in FIG. 2. The movable range of the rotary unit 26b may be set to a larger range than the above range, or may be set to a smaller range than the above range.

FIG. 3 shows a state in which the MC-side chuck 23 is located in the workpiece pass/receive position P1. This state is a state in which the X slide 26a has moved to the front side (the negative X2-side) of the bed 21a and the MC-side chuck 23 has been directed toward or facing the front side. In the workpiece pass/receive position P1, the MC-side chuck 23 passes or receives the workpiece W to or from the loader 300. By locating the MC-side chuck 23 in the workpiece pass/receive position P1, the MC-side chuck 23 directed toward or facing the front side (the negative X2-side) and the lathe-side chucks 13, 14 of the lathe 100 are able to be arranged side by side in the second direction D2, for example, as shown in FIG. 1B. That is, the workpiece pass/receive position P1 is set to the same or substantially the position as the workpiece pass/receive positions of the lathe-side chucks 13, 14 in the first direction D1. Also, as shown in FIG. 1A, the distances from a guide rail 34b (to be discussed later) to the MC-side chuck 23 and lathe-side chucks 13, 14 in the vertical direction (the Y1- and Y2-directions) are set to the same or substantially the same distance. The vertical distances from the guide rail 34b to the MC-side chuck 23 and lathe-side chucks 13, 14 may be set to different distances.

The parallel movement of the MC-side chuck 23 by the drive system M1 and the turn of the MC-side chuck 23 by the drive system M2 are able to be controlled by an MC controller CONT2 (to be discussed later). The MC controller CONT2 is able to control the MC-side chuck 23 so that the MC-side chuck 23 performs parallel movement and turning one by one (e.g., perform parallel movement and turning separately), or is able to control the MC-side chuck 23 so that the MC-side chuck 23 turns while moving in parallel.

The tool main spindle 24 holds the rotary tool T2 that machines the workpiece W. The rotary tool T2 is, for example, a drill or end mill. The tool main spindle 24 holds the rotary tool T2 in such a manner that the front end of the rotary tool T2 is directed toward or facing the negative $Z_2$-direction. Thus, the rotary tool T2 and MC-side chuck 23 are located side by side (e.g., adjacent to each other). A rotary drive source that rotates the rotary tool T2 is connected to the tool main spindle 24. The rotary drive source enables the rotary tool T2 to rotate around an axis parallel with the horizontal direction (the second direction D2: the $Z_2$-direction), which differs from the first direction D1.

The tool main spindle 24 is fixed to a YZ slide 27. The YZ slide 27 is supported by a column 28. The YZ slide 27 is able to be moved in the $Y_2$- and $Z_2$-directions by a drive system. The column 28 is fixed to the bed 21a, for example.

The tool magazine 25 houses one or more rotary tools T2. The tool magazine 25 is disposed on the back side (the positive $X_2$-side) of the tool main spindle 24, for example. Such disposition (e.g., positioning) is able to reduce the height of the machining center 200. The tool magazine 25 includes multiple housings 25a that are able to house the rotary tools T2. The housings 25a are disposed side by side, for example, around an axis parallel with the $X_2$-direction. The tool magazine 25 is rotatable around the axis parallel with the $X_2$-direction. By rotating the tool magazine 25, a housing 25a housing a predetermined rotary tool T2 is located in a replacement position 25P. In this state, the rotary tool T2 housed in the housing 25a is mounted on the tool main spindle 24 by a tool mount/demount device. The tool mount/demount device is also able to demount the rotary tool T2 mounted on the tool main spindle 24. The tool mount/demount device enables the rotary tool T2 mounted on the tool main spindle 24 to be replaced with the rotary tool T2 housed in the tool magazine 25.

The workpiece placement unit 22 has thereon (e.g., supports), for example, the workpiece W machined by the machining center 200. As with the workpiece placement unit 12 of the lathe 100, the workpiece placement unit 22 is, for example, a fixed base, but is not limited thereto. For example, it is able to be a conveyor, rotary base, or the like. The workpiece placement unit 22 and workpiece placement unit 12 sandwich the lathe 100 and machining center 200 in the second direction D2 (the $X_1$-direction or $Z_2$-direction). Preferred embodiments of the present invention also are able to include only one of the workpiece placement units 12, 22. In such an example, a yet-to-be-machined workpiece W is able to be placed on the workpiece placement unit 12 or 22, for example.

Preferably, the loader 300 includes a loader head 31 and a loader drive unit 32. For example, the loader 300 carries the workpiece W between the workpiece placement units 12, 22, main spindles 15, 16, and MC-side chuck 23. The loader head 31 is provided with a loader chuck 33. The loader chuck 33 grasps the workpiece W using multiple grasping claws 33a, for example. For example, the loader chuck 33 is structured so as to be able to take a posture in which it is directing the workpiece W to the negative $Y_1$-direction while grasping the workpiece W and a posture in which it is directing the workpiece W to the negative $Z_1$-direction (to the main shafts 15, 16) while grasping the workpiece W.

The loader drive unit 32 includes an X drive unit 34, a Z drive unit 35, and a Y drive unit 36. The X drive unit 34 includes an X moving body 34a and a guide rail (a guide) 34b. The X moving body 34a is disposed so as to be movable in the $X_1$-direction along the guide rail 34b by a drive source. The negative $X_1$-side end of the guide rail 34b is disposed above the workpiece placement unit 12 of the lathe 100. Thus, the loader head 31 is able to connect to the workpiece placement unit 12. Similarly, the positive $X_1$-side end of the guide rail 34b is disposed above the workpiece placement unit 22 of the machining center 200. Thus, the loader head 31 is able to connect to the workpiece placement unit 22. In a preferred embodiment of the present invention, the workpiece placement units 12, 22 are shared by the lathe 100 and machining center 200, resulting in preventing or significantly reducing upsizing of the machine tool system SYS. Preferably, the four components, that is, the cutting tool T1 of the lathe 100, the lathe-side chucks 13, 14, the rotary tool T2 of the machining center 200, and the MC-side chuck 23 are disposed side by side along the guide rail 34b.

The Z drive unit 35 is provided on the X moving body 34a. The Z drive unit 35 includes a Z moving body 35a. The Z moving body 35a is movable along a guide in the $Z_1$-direction by a drive source. The Y drive unit 36 is provided on the Z moving body 35a. The Y drive unit 36 includes a Y moving body 36a. The Y moving body 36a is movable along a guide in the $Y_1$-direction by a drive source.

The loader head 31 is disposed under the Y moving body 36a. When the X drive unit 34, Z drive unit 35, and/or Y drive unit 36 drive the corresponding moving bodies, the workpiece W grasped by the loader chuck 33 of the loader head 31 is carried in the $X_1$-, $Y_1$-, or $Z_1$-direction, or a combined direction thereof. The drive of the loader 300 is able to be controlled by a lathe controller CONT1, for example.

The lathe controller CONT1 centrally controls the operation of the lathe 100 and loader 300 based on a predetermined machining program, for example. The MC controller CONT2 centrally controls the operation of the machining center 200 based on a predetermined machining program, for example. The MC controller CONT2 is able to control the operation of the loader 300, or both the lathe controller CONT1 and the MC controller CONT2 are be able to control the operation of the loader 300.

Preferably, the lathe controller CONT1 and the MC controller CONT2 each preferably include a communication unit. The communication unit communicates various types of information, including the operation status of the lathe 100, machining center 200, and loader 300 and the types of tools used by the lathe 100 and machining center 200. Thus, the lathe controller CONT1 is able to control the operation of the lathe 100 and loader 300 in accordance with the operation status of the machining center 200. Similarly, the MC controller CONT2 is able to control the operation of the machining center 200 in accordance with the operation status of the lathe 100 and loader 300.

Next, exemplary operations of the machine tool system SYS will be described. First, the lathe controller CONT1 locates the loader head 31 of the loader 300 above the workpiece placement unit 12 (on the positive $Y_1$-side thereof) and moves the Y moving body 36a in the negative $Y_1$-direction with the loader chuck 33 directed downward (to the negative $Y_1$-direction). The lathe controller CONT1 then causes the grasping claws 33a to hold the workpiece W previously placed on the workpiece placement unit 12, for example.

The lathe controller CONT1 then directs the loader chuck 33 and workpiece W to the negative $Z_1$-direction. The lathe controller CONT1 then causes the Y drive unit 36 to move the loader head 31 in the positive $Y_1$-direction so that the loader head 31 is located at a predetermined height, for example. The lathe controller CONT1 then moves the loader head 31 in the positive $X_1$-direction so that the loader head 31 and workpiece W are located, for example, over the main spindle 15 (on the positive $Y_1$-side thereof). Described below is an example where the workpiece W is located on the main shaft 15. Note that if the workpiece W is located on the main shaft 16, the loader head 31 and workpiece W are located over the main shaft 16.

Figure 4A:
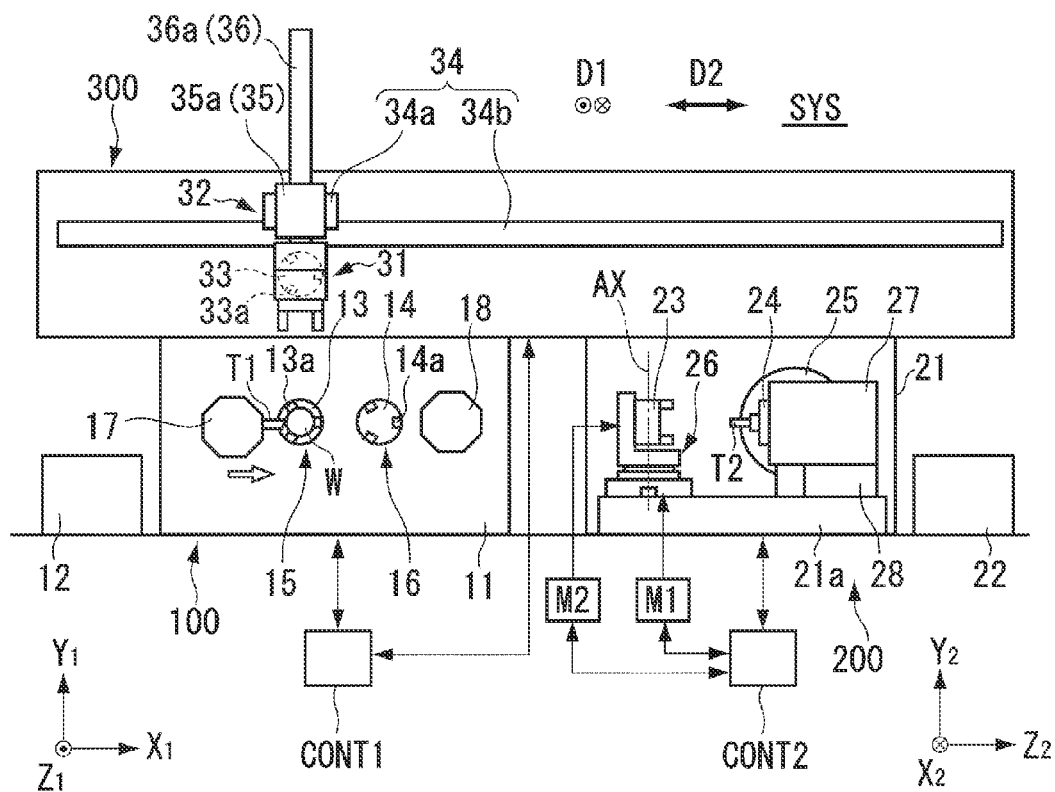
FIGS. 4A and 4B include a diagram showing an example of operation of the machine tool system according to a preferred embodiment of the present invention.

The lathe controller CONT1 then moves the Y moving body 36a in the negative $Y_1$-direction so that the workpiece W faces the main spindle 15. The lathe controller CONT1 then moves the Z moving body 35a in the negative $Z_1$-direction and causes the grasping claws 13a of the main shaft 15 to hold the workpiece W. The lathe controller CONT1 then moves the Z moving body 35a in the positive $Z_1$- and positive $Y_1$-directions to return the loader head 31 (e.g., to return the loader head 31 to a previous position). Then, as shown in FIG. 4A, the lathe controller CONT1 machines the workpiece W using the tool T1 disposed on the turret 17 based on a predetermined machining recipe (e.g., machining instructions), for example.

Figure 4B:
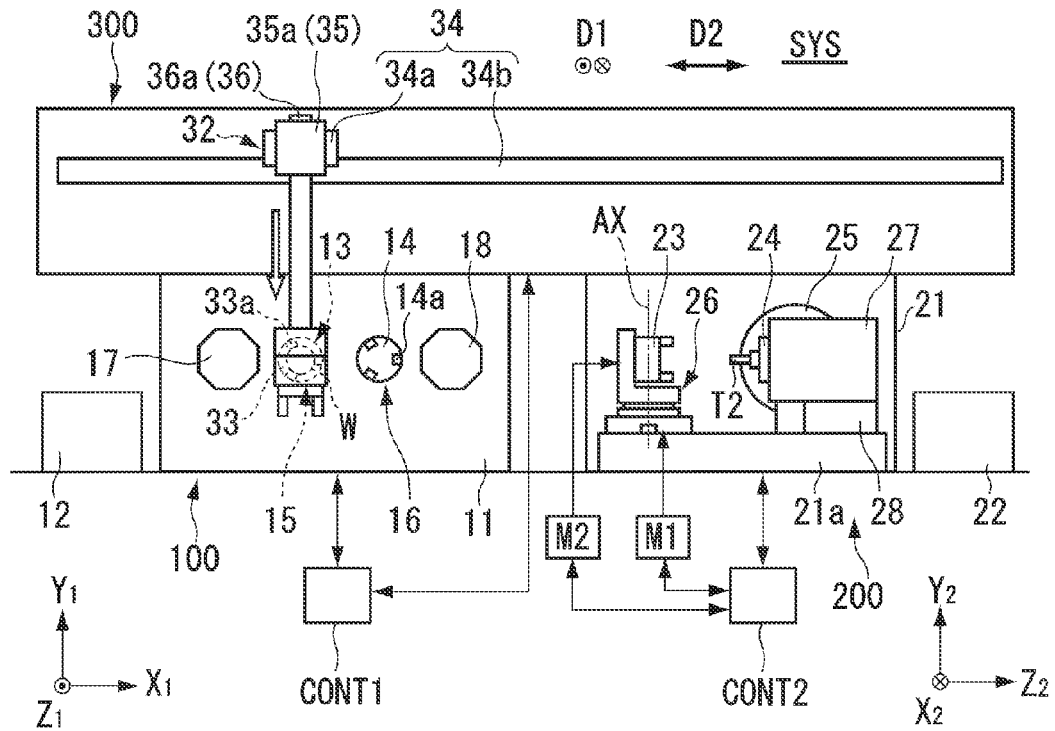

After machining the workpiece W, the lathe controller CONT1 causes (e.g., controls) the main spindle 15 to pass the workpiece W to the loader chuck 33. Specifically, as shown in FIG. 4B, the lathe controller CONT1 first causes the Y moving body 36a to move in the negative $Y_1$-direction again so that the loader chuck 33 faces the workpiece W. The lathe controller CONT1 then moves the loader head 31 in the negative $Z_1$-direction and causes the grasping claws 33a of the loader chuck 33 to hold the workpiece W. The lathe controller CONT1 then causes the grasping claws 13a of the main spindle 15 to open so that the workpiece W is passed to the loader chuck 33.

Figure 5A:
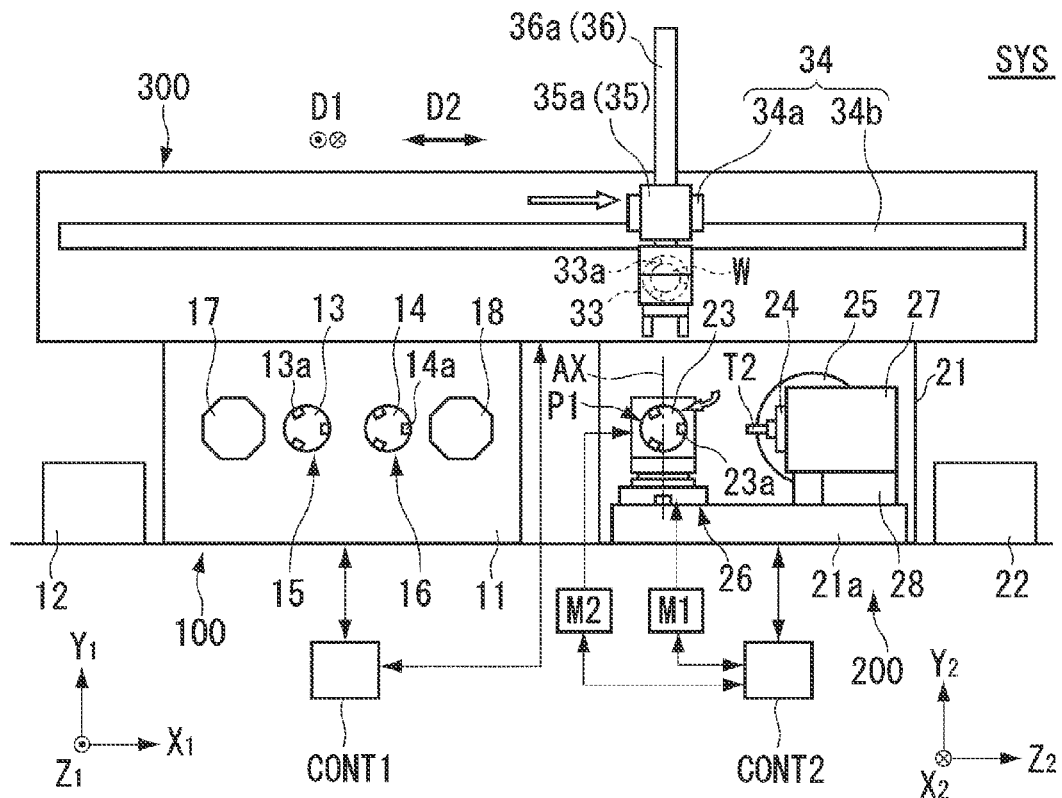
FIGS. 5A and 5B include a diagram showing an example of operation of the machine tool system according to a preferred embodiment of the present invention.

After passing the workpiece W, the lathe controller CONT1 locates the loader head 31 and workpiece W over the main spindle 15 (on the positive $Y_1$-side thereof). Then, as shown in FIG. 5A, the lathe controller CONT1 moves the loader head 31 in the positive $X_1$-direction and locates it over the MC-side chuck (on the positive $Y_2$-side thereof). The MC controller CONT2 directs the grasping claws 23a of the MC-side chuck 23 to the front side (the negative $X_2$-side) and moves the X slide 26a to the front side (the negative $X_2$-side), thus locating the MC-side chuck 23 in the workpiece pass/receive position P1. As a result, in the first direction D1 (the $Z_1$-direction, the $X_2$-direction), the position of the MC-side chuck 23 (the workpiece pass/receive position P1) matches the positions in which the main spindles 15, 16 pass or receive the workpiece W.

Figure 5B:
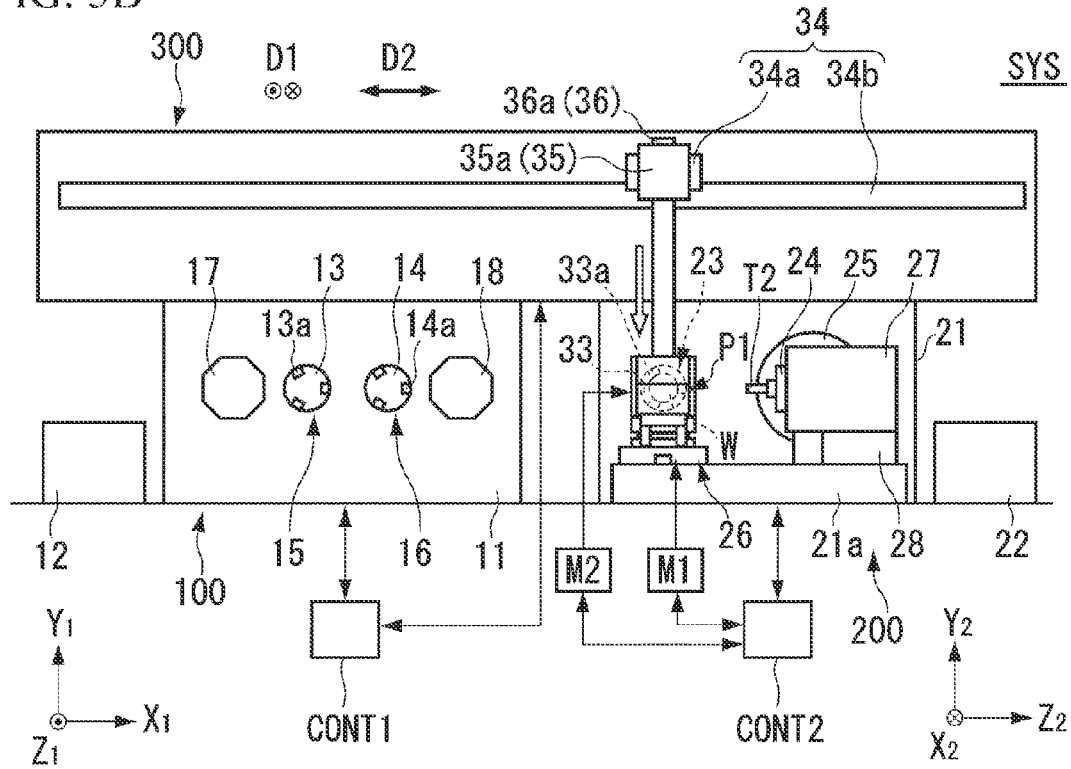

Then, as shown in FIG. 5B, the lathe controller CONT1 moves the Y moving body 36a in the negative $Y_1$-direction so that the workpiece W faces the MC-side chuck 23. The lathe controller CONT1 then moves the Z moving body 35a in the negative $Z_1$-direction so that the workpiece W is located among the grasping claws 23a of the MC-side chuck 23. In this state, the MC controller CONT2 causes the grasping claws 23a to close in order to hold the workpiece W. The lathe controller CONT1 causes the grasping claws 33a to open and pass the workpiece W to the MC-side chuck 23. As seen above, the loader 300 is able to directly pass or receive the workpiece W not only to or from the lathe-side chucks 13, 14 of the lathe 100 but also to or from the MC-side chuck 23 of the machining center 200. Also, in the first direction D1, the position in which the MC-side chuck 23 receives the workpiece W is matched to the positions in which main spindles 15, 16 receive the workpiece W. Thus, the loader 300 is able to pass or receive the workpiece W to or from the lathe-side chucks 13, 14 and MC-side chuck 23 by performing the same or substantially the same operation in the first direction D1.

Figure 6A:
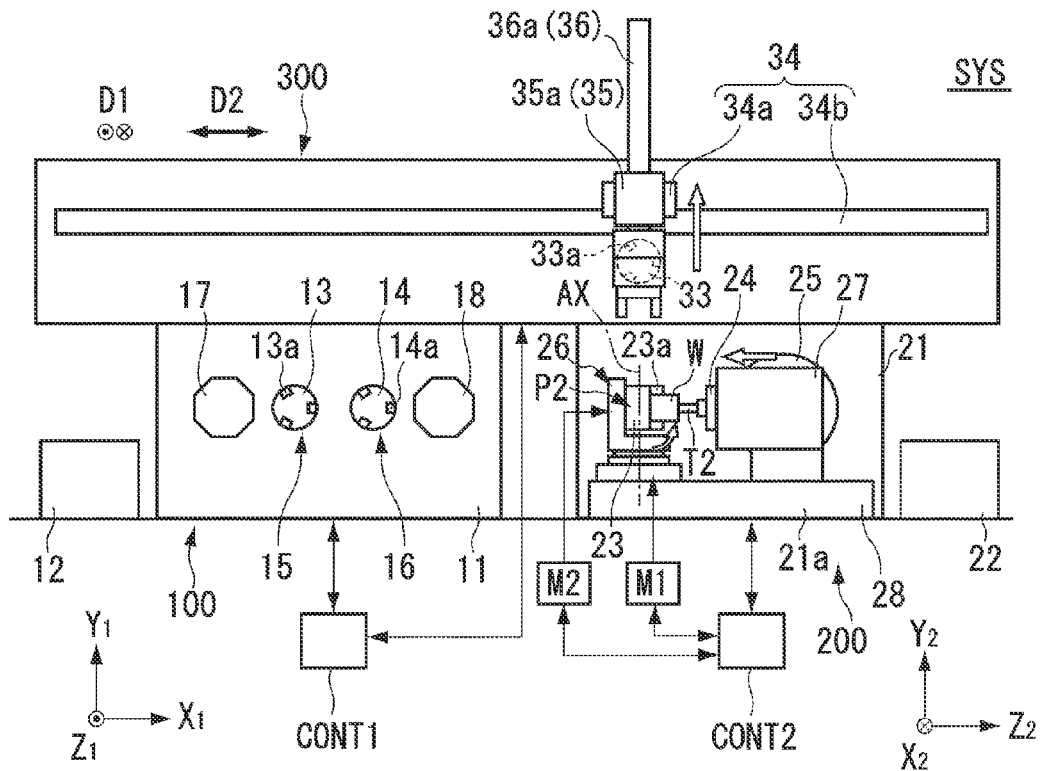
FIGS. 6A and 6B include a diagram showing an example of operation of the machine tool system according to a preferred embodiment of the present invention.

Then, as shown in FIG. 6A, the lathe controller CONT1 moves the Z moving body 35a in the positive $Z_1$- and positive $Y_1$-directions to return the loader head 31. The MC controller CONT2 directs the grasping claws 23a of the MC-side chuck 23 to the lateral side (the positive $Z_2$-side) and moves the X slide 26a to the positive $X_2$-side, thus locating the MC-side chuck 23 in the machining position P2. Thus, the MC-side chuck 23 faces the tool main spindle 24 while holding the workpiece W. Then, the MC controller CONT2 rotates the rotary tool T2, as well as moves the YZ slide 27 in the $Y_2$- and $Z_2$-directions based on a predetermined machining recipe. The MC controller CONT2 also moves the X slide 26a in the $X_2$-direction and machines the workpiece W. The MC controller CONT2 is able to replace the rotary tool T2 using a tool mount/demount device. After machining the workpiece W, the MC controller CONT2 stops rotating the rotary tool T2 and moves the YZ slide 27 in the $Y_2$- and $Z_2$-directions to return it to the original position.

The MC controller CONT2 then causes the MC-side chuck 23 to pass the workpiece W to the loader chuck 33. Specifically, the MC controller CONT2 rotates the MC-side chuck 23 to direct the workpiece W to the front side (the negative $X_2$-side) and moves the X slide 26a to the front side (the negative $X_2$-side), thus locating the MC-side chuck 23 in the workpiece pass/receive position P1. Then, the lathe controller CONT1 moves the Y moving body 36a in the negative $Y_1$-direction so that the loader chuck 33 faces the MC-side chuck 23 (as in the state shown in FIG. 5B, for example). The lathe controller CONT1 then moves the Z moving body 35a in the negative $Z_1$-direction so that the workpiece W is located between the grasping claws 23a of the MC-side chuck 23.

The lathe controller CONT1 then causes the grasping claws 33a of the loader chuck 33 to close and hold the workpiece W. The MC controller CONT2 causes the grasping claws 23a of the MC-side chuck 23 to open and pass the workpiece W to the loader chuck 33.

Figure 6B:
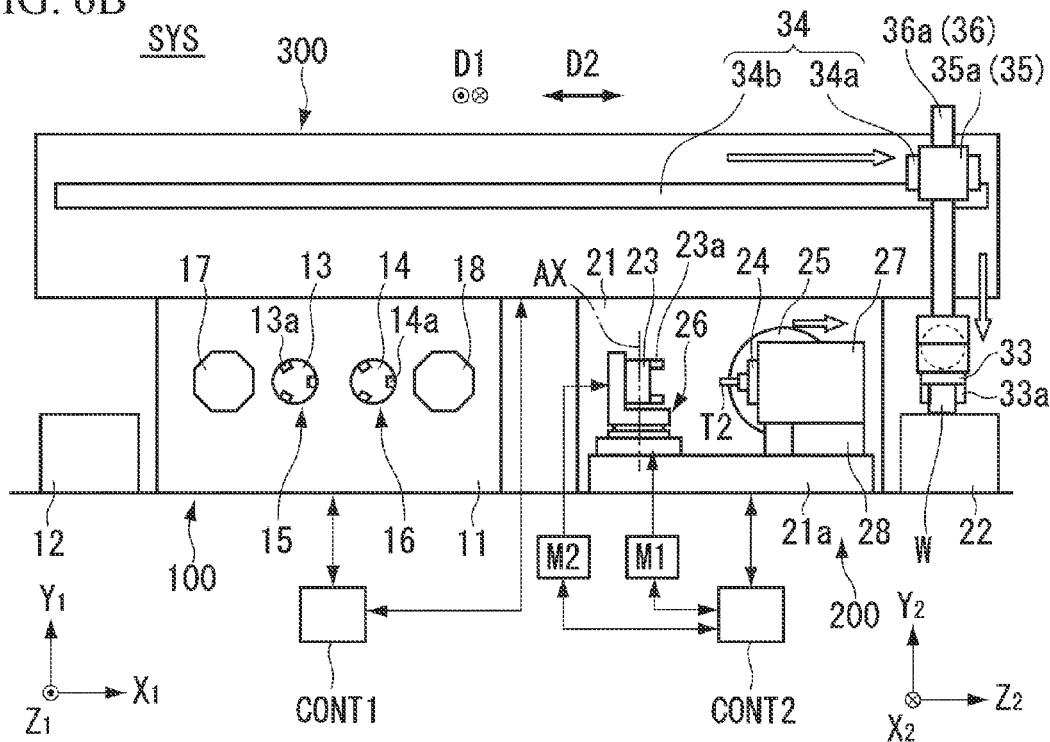

After passing the workpiece W, the lathe controller CONT1 raises the loader head 31 and workpiece W above the MC-side chuck 23 (on the positive $Y_1$-side thereof) and moves the loader head 31 in the positive $X_1$-direction, thus locating the loader head 31 and workpiece W above the workpiece placement unit 22 (on the positive $Y_2$-side thereof). Then, as shown in FIG. 6B, the lathe controller CONT1 lowers the Y moving body 36a and causes the grasping claws 33a of the loader chuck 33 to open, thus placing the machined workpiece W on the workpiece placement unit 22.

According to preferred embodiments of the present invention, the loader 300 is able to directly pass the workpiece W not only to the lathe-side chucks 13, 14 but also to the MC-side chuck 23 directed toward or facing the front side of the machining center 200. Thus, it is possible to reduce the workpiece W carrying time and reduce the workpiece W machining time. Also, there is no necessity to separately provide the workpiece W pass/receive position between the lathe 100 and machining center 200. Thus, upsizing of the entire machine tool system SYS is able to be prevented or significantly reduced.

Conventionally, to carry the workpiece W from the machining area of the lathe to the machining area of the machining center, a robot is used in some cases, for example. In those cases, the robot is disposed on the front side of the lathe 100 or the machining center 200. For this reason, when the operator accesses the lathe 100 or machining center, the robot obstructs the operation. Also, a space for installing a robot is needed, resulting in upsizing of the system. In a preferred embodiment of the present invention, on the other hand, the loader 300 directly passes or receives the workpiece W to or from the lathe-side chucks 13, 14 and MC-side chuck 23, thus eliminating the necessity of using a robot. Accordingly, a space for installing a robot becomes unnecessary, and anything that obstructs the operation, such as a robot, is not present in front of the lathe 100 or machining center 200. As a result, it is possible to ensure the operability of the operator and to reduce excess use of space or cost.

Also, in the horizontal machining center 200, the tool magazine 25 is disposed on the back side of the tool main spindle 24. Thus, the height of the machining center 200 is able to be reduced or minimized. As a result, for example, the tool magazine 25 is prevented from interfering with the already installed lathe 100 and loader 300 in the height direction. For this reason, the machining center 200 is able to be installed later.

While the preferred embodiment has been described above, the present invention is not limited thereto. Various changes can be made to the preferred embodiments without departing from the spirit and scope of the present invention.

For example, while the loader 300 is able to include the single loader head 31, preferred embodiments of the present invention are able to include the loader 300 which includes multiple loader heads.

Figure 7:
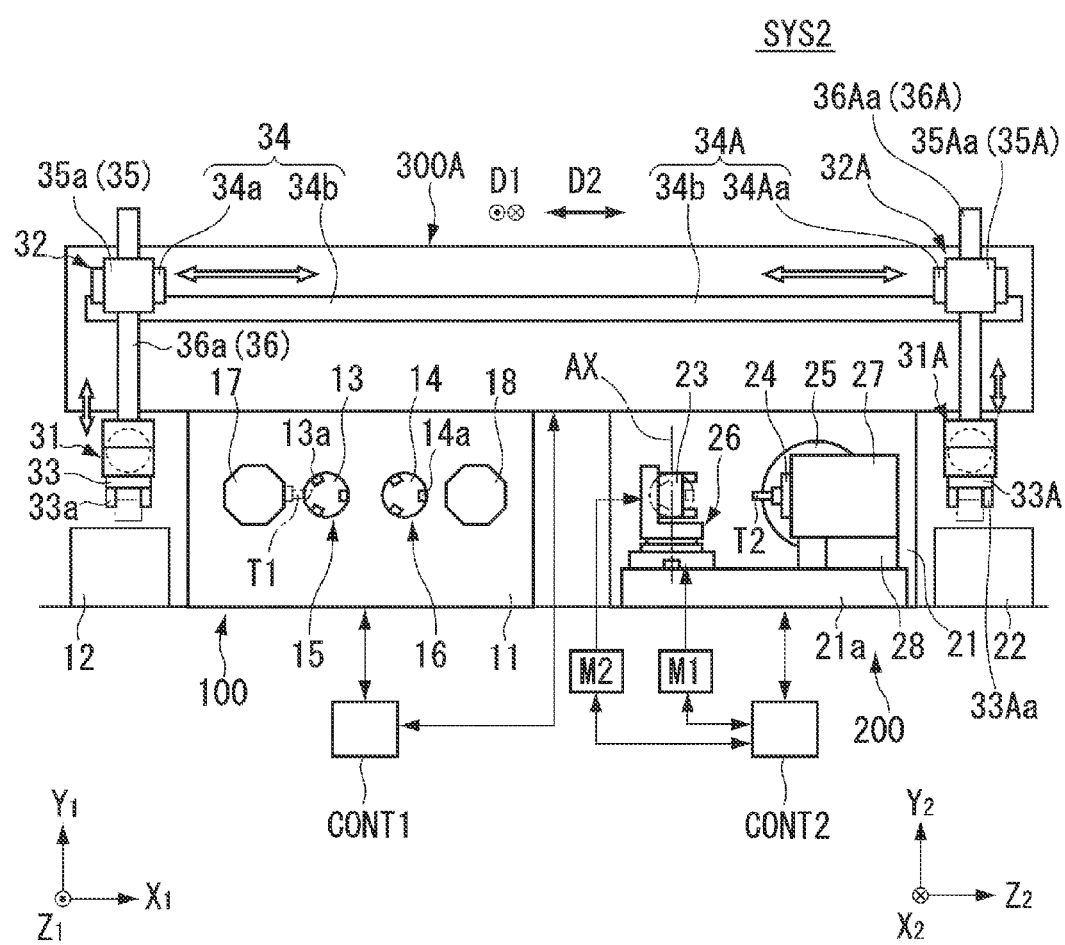
FIG. 7 is a diagram showing an example of a machine tool system according to a preferred embodiment of the present invention.

FIG. 7 is a diagram showing an example of a machine tool system SYS2 according to a modification of a preferred embodiment of the present invention. In the machine tool system SYS2 shown in FIG. 7, a loader 300A includes two loader heads, 31 and 31A. The loader head 31A preferably has the same structure as the loader head 31. The loader head 31A includes a loader chuck 33A. The loader chuck 33A grasps a workpiece W using multiple grasping claws 33Aa.

The loader head 31A is provided with a loader drive unit 32A that drives the loader head 31A. The loader drive unit 32A includes an X drive unit 34A, a Z drive unit 35A, and a Y drive unit 36A. The X drive unit 34A includes an X moving body 34Aa and the guide rail 34b. The guide rail 34b is shared by the loader heads 31, 31A. The Z drive unit 35A and Y drive unit 36A have the same structure as the Z drive unit 35 and Y drive unit 36 of the above-described preferred embodiments of the present invention.

According to this preferred embodiment of the present invention, the workpiece W is able to be carried more efficiently. For example, the loader head 31 is able to carry the workpiece W between a workpiece placement unit 12, lathe-side chucks 13, 14, and an MC-side chuck 23, and the loader head 31A is able to carry the workpiece W among the MC-side chuck 23 and a workpiece placement unit 22. A preferred embodiment of the present invention in which multiple loader heads are used is not limited to the preferred embodiments described above. For example, the loader head 31 is able to carry the workpiece W between the workpiece placement unit 12 and lathe-side chucks 13, 14, and the loader head 31A is able to carry the workpiece W between the lathe-side chucks 13, 14, MC-side chuck 23, and workpiece placement unit 22.

While in preferred embodiments of the present invention, the lathe 100 is preferably disposed on the negative $X_1$-side of the machine tool system SYS (e.g., on the left side of FIG. 1) and the machining center 200 is disposed on the positive $Z_2$-side thereof (e.g., on the right side of FIG. 1), the lathe 100 and the machining center 200 may be horizontally reversely disposed, for example.

While in preferred embodiments of the present invention, the workpiece W machined by the lathe 100 preferably is carried to the machining center 200, other preferred embodiments are able to be used. For example, the workpiece W machined by the machining center 200 is able to be carried to the lathe 100.

While in preferred embodiments of the present invention, the lathe-side chucks 13, 14 and MC-side chuck 23 preferably are used as the lathe-side workpiece holders and the MC-side workpiece holder, other structures are able to be used. That is, for example, elements other than the chucks are able to be used as long as the elements are able to hold the workpiece W.

Preferred embodiments of the present invention also provide an example of a method for carrying the workpiece W using the loader 300 between the lathe 100 and the machining center 200 disposed side by side with the lathe 100. In this exemplary method, the loader 300 moves along the guide rail 34b extending above the lathe-side chucks 13, 14 and the MC-side chuck 23 along the horizontal direction and carries the workpiece W between the lathe-side chucks 13, 14 and the MC-side chuck 23.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A machine tool system comprising:
    a lathe;
    a machining center disposed side by side with the lathe; and
    a loader that carries a workpiece; wherein
    the lathe includes:
        a lathe-side workpiece holder that holds the workpiece such that the workpiece is directed toward a front side of the machine tool system;
        a main spindle that rotates around an axis; and
        a tool that machines the workpiece;
    the machining center includes:
        a rotary tool that rotates around an axis that extends in a horizontal direction which is parallel to the front side of the machine tool system;
        a machining center-side workpiece holder that holds the workpiece and is able to turn between a first position in which the machining center-side workpiece holder holds the workpiece such that the workpiece is directed toward the front side of the machine tool system and a second position in which the machining center-side workpiece holder holds the workpiece such that the workpiece is directed toward the rotary tool; and
        a bed on which the rotary tool and the machining center-side workpiece holder are disposed;
    the loader includes:
        a guide that is positioned above the lathe-side workpiece holder and the machining center-side workpiece holder and extends longitudinally in the horizontal direction; and
        a loader head that holds the workpiece and carries the workpiece, by moving along the guide, between the lathe-side workpiece holder and the machining center-side workpiece holder when the machining center-side workpiece holder is in the first position; and
    the bed on which the rotary tool and the machining center-side workpiece holder are disposed is spaced away from the lathe.

2. The machine tool system according to claim 1, wherein a vertical distance from the guide to the lathe-side workpiece holder is equal to a vertical distance from the guide to the machining center-side workpiece holder.

3. The machine tool system according to claim 1, wherein the machining center-side workpiece holder is able to move between a workpiece pass and receive position in which the machining center-side workpiece holder is collinear with the lathe-side workpiece holder in the horizontal direction and a position in which machining is performed using the rotary tool.

4. The machine tool system according to claim 1, wherein the lathe includes, spaced apart from the main spindle in the horizontal direction, an additional main spindle.

5. The machine tool system according to claim 1, further comprising a workpiece placement unit that is disposed on a first side of both of the lathe and the machining center or a second side of both of the lathe and the machining center; wherein the guide is disposed such that the loader head is able to access the workpiece placement unit.

6. The machine tool system according to claim 1, further comprising:

a lathe controller that controls the lathe; and a machining-center controller that controls the machining center; wherein one of the lathe controller and the machining-center controller controls the loader.

7. A method for transporting, using a loader, a workpiece between a lathe and a machining center disposed side by side with the lathe, the lathe, the machining center, and the loader being included in a machine tool system, the lathe includes a lathe-side workpiece holder that holds the workpiece such that the workpiece is directed toward a front side of the machine tool system, the lathe also includes a main spindle that rotates around an axis and a tool that machines the workpiece, the machining center includes a rotary tool that rotates around an axis that extends in a horizontal direction which is parallel to the front side of the machine tool system, and the machining center also includes a machining center-side workpiece holder that holds the workpiece and is able to turn between at least a first position in which the machining center-side workpiece holder holds the workpiece such that the workpiece is directed toward the front side of the machine tool system and a second position in which the machining center-side workpiece holder holds the workpiece such that the workpiece is directed toward the rotary tool, the machining center also includes a bed on which the rotary tool and the machining center-side workpiece holder are disposed and that is spaced away from the lathe, the method comprising:

moving the loader along a guide that is positioned above the lathe-side workpiece holder and the machining center-side workpiece holder and extends longitudinally in the horizontal direction; and carrying the workpiece between the lathe-side workpiece holder and the machining center-side workpiece holder when the machining center-side workpiece holder is in the first position.

* * * * *